Nov. 19, 1968  D. A. SCHULZ  3,411,740
CHRISTMAS TREE STAND
Filed Nov. 23, 1966
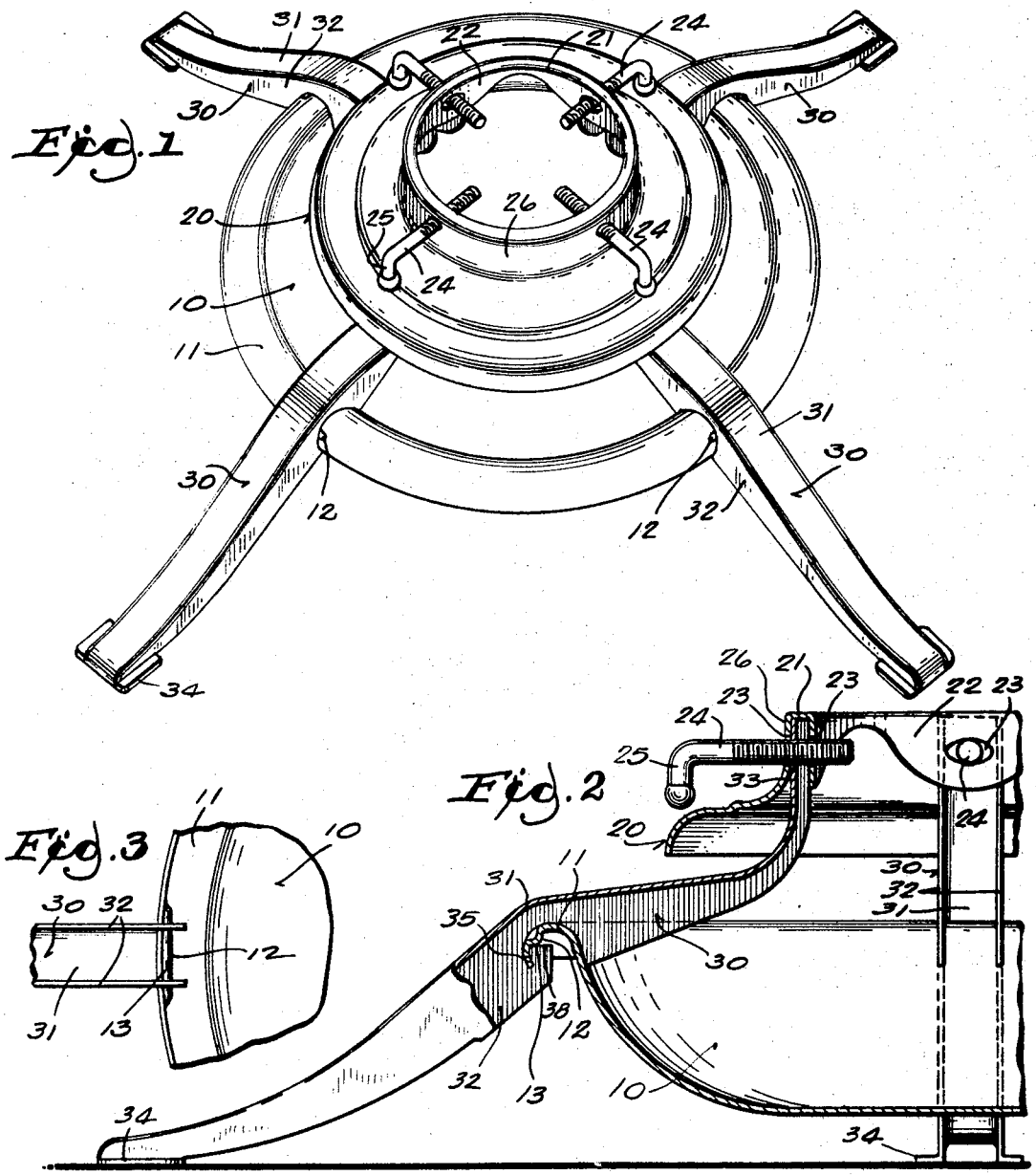
INVENTOR
DONALD A. SCHULZ
BY Wheeler, Wheeler, Haeussler Clemency
ATTORNEYS

United States Patent Office 3,411,740
Patented Nov. 19, 1968

1

3,411,740
CHRISTMAS TREE STAND
Donald A. Schulz, Wauwatosa, Wis., assignor to S-B Manufacturing Company, Milwaukee, Wis., a Wisconsin partnership
Filed Nov. 23, 1966, Ser. No. 596,710
5 Claims. (Cl. 248—48)

ABSTRACT OF THE DISCLOSURE

The stand disclosed herein has deep channel-shaped legs, a watering bowl for a tree having an edge which is curved at the top so that the free edge extends downwardly, a canopy which encircles the tree above the watering bowl and which is provided with inner and outer walls spaced to fit closely around the upper end of each leg of the stand, and which is provided with aligned inner and outer holes for the reception of tree securing screw members which are threaded into holes in the respective legs. The legs are slotted near the center, extending in a semi-circle generally upwardly, laterally, and downwardly toward the foot from the free edge, where the leg channel is deepest, to receive the semi-circular rim of the bowl. The tongue which is left in the side of the leg by the slot is truncated and rests on a downwardly directed shoulder which is pressed from the material of the rim of the bowl to provide a firm and exactly positioned engagement between the leg and the bowl.

Objects of the invention

The object of the invention is to provide a remarkably sturdy stand which is easily assembled and which is attractive in appearance. This novel combination provides a sturdy tree stand having a unique distribution of forces, and is economical, easy to assemble, and safe.

Summary of the invention

The novel features of my invention comprise the provision of deep channel-shaped legs having a novel attachment to the watering bowl comprising an outwardly and downwardly curved edge on the watering bowl, a complementary slot in the sides of the sides of the channel-shaped legs, a boss pressed inwardly into the curved margin of the watering bowl and a surface on the portion of the leg enclosed by said slot adapted to seat on said boss, and a canopy arranged to enclose the upper ends of the legs, the parts being shaped and proportioned so that the canopy is placed under compression when a tree is placed in the stand, the watering bowl is placed in tension, and the joint between the legs and the bowl is forced more firmly into engagement with the deeply channeled legs in order to firmly support the weight of the tree.

In the drawings

FIG. 1 is a perspective view of the Christmas tree stand of my invention.

FIG. 2 is a cross-sectional view of my Christmas tree stand on line 2—2 of FIG. 1 with a portion of the leg broken away to show the novel engagement between the leg and the bowl.

FIG. 3 is a fragmentary bottom view of my stand showing the engagement between the leg and the bowl.

FIG. 4 is an enlarged fragmentary view of the side of the leg showing details of the structure by which the leg is assembled to the bowl.

Description

Referring now to the drawings, the stand consists of a bowl 10 having an outwardly curving generally semi-circular rim 11 provided with a peripheral inwardly extending boss 12 at each location where a leg is to be mounted. Boss 12 is a linear depression as viewed from the outside of the bowl and provides a shoulder within the curve of rim 11 in a generally horizontal plane extending inwardly from the outer portion of rim 11. The plane 13 of the shoulder faces downwardly.

The center of the bowl may be provided with standard tree trunk engaging devices, not shown, for securing the lower end of the tree trunk at the center of the stand.

Above the bowl is a canopy 20 which may desirably have a generally bell-shaped exterior surface. The canopy is provided with a rather deep annular top flange 21 having downwardly turned inner margins 22 which encircle a central opening through which the tree trunk extends. Aligned openings 23 are provided in the outer margins 26 of flange 21 on the surface of canopy 20, and in the inner margins 22, to permit the insertion of screws 24 which are desirably provided with ends 25 at right angles to the threaded portion of the screw to aid in manually tightening the screw sufficiently to firmly engage the tree trunk, as is conventional. The space between the outer marginal surface 26 of canopy 20 and the downwardly directed inner marginal rim flange 22 is substantial, as best shown in FIG. 2, for the reception of the novel legs to be described.

The legs 30 are identical, and each comprises a deep channel which is nearly as deep as it is wide over most of its length, and deeper at the center near the bowl. The relatively wide annular flange 21 and depending walls 22 and 26 at the top of the canopy 20 receives the end of each leg. Each leg consists generally of an upper surface web 31 and sides 32. The upper end of each leg is a close fit within the annular pocket formed by broad annular flange 21 and depending flanges 22 and 26 of the rim of canopy 20. Each leg is provided with a hole 33 which is tapped to receive tree-trunk engaging screw 24. Thus, movement of the upper end of the leg is restrained by the screw 24, which passes through threaded hole 33 and unthreaded holes 23. The weight of the tree on screws 24 tends to force upper ends of the legs toward wall 22 which serves as a compression member between them. A fulcrum at the rim of the bowl, to be described, is the center about which such inward movement occurs and is itself urged outwardly by the reaction force.

Viewed from the side, leg 30 extends generally upwardly and inwardly from a floor engaging foot 34. The lower end portion of each leg is substantially horizontal where it terminates in foot 34. The top surface of each leg 30 is concave from the foot 34 to a point near the engagement with bowl 10. It is convex in the region in which the leg engages bowl 10, and again becomes concave in the region beneath canopy 20, ending in a substantially vertical upper end portion which is received between the outer wall of canopy 20 and the inner downwardly directed marginal flange 22.

As best shown in FIG. 4, each side 32 of each leg 30 is provided with a semi-circular slot 35 extending generally inwardly and downwardly from the margin of side 32 and conforming to the shape and orientation of the rim 11 of bowl 10, the slot 35 being concave in a downward direction. The portion of side 32 lying between slot 35 and the free margin of side 32 forms a tongue 36. The tongue is cut away at the end to form a vertical surface 37 to facilitate insertion of rim 11 into slot 35. Tongue 36 is also cut away to form a horizontal surface 38 to abut surface 13 of boss 12.

The engagement between horizontal surface 38 of tongue 36 and horizontal shoulder 13 on block 12 provides a firm support for bowl 10 at each leg. The outer surfaces of slot 35 engage a pair of parallel radial lines on the curved rim 11 of bowl 10, and lock bowl 10 very tightly onto legs 30, especially when a downward and outward force is applied to the upper end of leg 30, as always happens when the stand is in use, due to the weight of the tree bearing down on screws 24 which are screwed into the trunk of a tree and are threaded in holes 33 in legs 30. Thus the rim 11 of bowl 10 is in tension, between legs 30, and forms a stop which prevents pivoting of leg 30 in response to downward force, as surface 22 prevents pivoting of the upper end of the leg by compression. Since the canopy restrains the upper portion of each leg by serving as a compression member, and the bowl restrains the center of each leg by serving as a tension member which is accurately located by bosses in the bowl rim, and since the depth of sides 32 of legs 30 is sufficient to insure that trees of any reasonable size may be carried without bending the legs, the result is a rigid, inexpensive and readily assembled structure. The balancing of the various forces is accomplished in a new way which effectively supports a large tree. At the same time, the stand may be dissassembled to store in little more than the space required by bowl 10.

I claim:

1. In a Christmas tree stand including a watering bowl, a plurality of legs supporting the watering bowl, tree trunk engaging screws, and a canopy, said legs having ends extending above the watering bowl and the canopy being supported above the watering bowl by the ends of the legs, the improvement comprising:

said legs comprising downwardly opening channels having an upper web and generally parallel sides, said watering bowl being provided with a generally semi-circular rim having a downwardly extending free edge, said sides of each leg being provided with an arcuate slot having an upper margin complementary to said rim and in close fitting engagement with said rim, said legs extending below the level of the bottom of said bowl when said legs are in assembled relationship with said bowl, said canopy having an inner wall defining an opening for a tree trunk, and said trunk engaging screws securing the upper ends of said legs to said inner wall of said canopy, whereby said canopy is placed in compression and said bowl is placed in tension by a weight supported by said stand.

2. The device of claim 1 in which the rim of said bowl is provided with a peripherally extending boss extending inwardly from a surface of said rim and having a downwardly facing generally horizontal surface, the portion of said leg within said arcuate slot being provided with a generally horizontal upper surface engaged with said boss when said parts are assembled, said surface limiting insertion of said rim into said slot and providing a fulcrum for pivoting movement of said leg about the rim of said bowl to apply tension to said bowl.

3. The device of claim 1 in which the rim of said bowl is provided with a peripherally extending boss extending inwardly from a surface of said rim and having a downwardly facing generally horizontal surface, the portion of said leg within said arcuate slot being provided with a generally horizontal surface engaged with said boss when said parts are assembled, said surface limiting insertion of said rim into said slot and providing a fulcrum for pivoting movement of said leg about the rim of said bowl to apply tension to said bowl, the portion of each leg enclosed by said arcuate slot being free of contact with said bowl in the assembled relationship to permit free assembly of the semi-circular rim in the semi-circular slot.

4. A Christmas tree stand comprising a watering bowl having an annular generally semi-circular rim with a downwardly extending free edge, and a plurality of channel-shaped legs each having a pair of downwardly extending sides with free lower margins, each said downwardly extending channel side being provided approximately midway of its length with an arcuate slot having an upper margin complementary to the shape of said generally semi-circular rim and contacting said rim in the assembled position, the lower end of each said leg being below the level of the bottom of the watering bowl, a generally circular canopy having an opening above the center of the watering bowl for a tree trunk and a pair of annular walls about said opening spaced to receive the upper end of each said leg in close fitting engagement, means on the upper ends of said legs to retain said legs in assembled relation with the inner and outer walls of said canopy and to engage a tree trunk, whereby said watering bowl serves as a tension member between said legs and said canopy serves as a compression member between said legs.

5. The device of claim 4 in which the rim of said bowl is provided with a peripherally extending boss extending inwardly from a surface of said rim and having a downwardly facing generally horizontal surface, the portion of said leg within said arcuate slot being provided with a generally horizontal upper surface engaged with said boss when said parts are assembled, whereby to provide a fulcrum for pivoting movement of said leg about the rim of said bowl to apply tension to said bowl, the portion of each said leg enclosed by said arcuate slot being a substantial distance from the underside of said bowl in the portion between said boss and the intersection of said slot with the margin of said leg to permit free assembly of the semi-circular rim in the semi-circular slot.

References Cited

UNITED STATES PATENTS

| | | | |
|---|---|---|---|
| 2,652,217 | 9/1953 | Schulz | 248—48 |
| 2,028,129 | 1/1936 | Allerton | 248—47 |

FOREIGN PATENTS

| | | |
|---|---|---|
| 16,473 | 10/1903 | Sweden. |
| 932,432 | 7/1963 | Great Britain. |

JOHN PETO, *Primary Examiner.*